United States Patent
Song et al.

(10) Patent No.: US 10,204,595 B2
(45) Date of Patent: Feb. 12, 2019

(54) METHODS AND DEVICES FOR ADJUSTING SCREEN BRIGHTNESS

(71) Applicant: Beijing Xiaomi Mobile Software Co., Ltd., Haidian District, Beijing (CN)

(72) Inventors: Kailun Song, Beijing (CN); Yuzhen Wan, Beijing (CN); Jiankai Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/683,109

(22) Filed: Aug. 22, 2017

(65) Prior Publication Data
US 2018/0090104 A1    Mar. 29, 2018

(30) Foreign Application Priority Data
Sep. 29, 2016    (CN) .......................... 2016 1 0866720

(51) Int. Cl.
*G09G 3/20*    (2006.01)
*G09G 5/10*    (2006.01)
(Continued)

(52) U.S. Cl.
CPC ............. *G09G 5/10* (2013.01); *G01C 21/367* (2013.01); *G09G 3/20* (2013.01); *H04M 1/72569* (2013.01); *G09G 2320/0233* (2013.01); *G09G 2320/0606* (2013.01); *G09G 2320/0626* (2013.01); *G09G 2360/141* (2013.01);
(Continued)

(58) Field of Classification Search
CPC ..... G09G 2320/0626; G09G 2360/144; G09G 2320/0606
See application file for complete search history.

(56) References Cited

U.S. PATENT DOCUMENTS

| | | | |
|---|---|---|---|
| 6,753,842 B1 | 6/2004 | Williams et al. | |
| 2007/0173297 A1* | 7/2007 | Cho .................. | H04M 1/22 455/574 |

(Continued)

FOREIGN PATENT DOCUMENTS

| | | |
|---|---|---|
| CN | 101192398 A | 6/2008 |
| CN | 103347247 A | 10/2013 |

(Continued)

OTHER PUBLICATIONS

Extended European Search Report issued in corresponding European Application No. 17191859.2, dated Feb. 9, 2018, 21 pages.
(Continued)

Primary Examiner — Laurence J Lee
(74) Attorney, Agent, or Firm — Arch & Lake LLP

(57) ABSTRACT

Methods and apparatuses are provided for adjusting screen brightness. The method may include: determining a screen brightness adjusting curve corresponding to current time, and determining current screen brightness according to current ambient luminance and the screen brightness adjusting curve. With the technical solutions provided in the present disclosure, the screen brightness can be adjusted to be most suitable for human eyes according to time; the problem of unsatisfactory screen brightness caused by adjusting a screen into same brightness according to same ambient brightness in different time periods is avoided.

15 Claims, 6 Drawing Sheets

(51) Int. Cl.
*H04M 1/22* (2006.01)
*G01C 21/36* (2006.01)
*H04M 1/725* (2006.01)

(52) U.S. Cl.
CPC ... *G09G 2360/144* (2013.01); *G09G 2360/16* (2013.01); *H04M 1/22* (2013.01); *H04M 1/72566* (2013.01); *H04M 2250/10* (2013.01); *H04M 2250/12* (2013.01)

(56) References Cited

U.S. PATENT DOCUMENTS

2007/0273624 A1* 11/2007 Geelen ................... G01C 21/36
                                                            345/84
2010/0194725 A1    8/2010 Yoshida et al.

FOREIGN PATENT DOCUMENTS

| CN | 104851414 A   | 8/2015  |
|----|---------------|---------|
| CN | 105261346 A   | 1/2016  |
| CN | 105551433 A * | 5/2016  |
| EP | 1686777 A1    | 8/2006  |
| EP | 2214155 A1    | 8/2010  |
| EP | 2299723 A1    | 3/2011  |
| EP | 2528308 A1    | 11/2012 |

OTHER PUBLICATIONS

Anonymous, "Sunrise equation—Wikipedia," Jul. 6, 2016, 5 pages. [URL] https://en.wikipedia.org/w/index.php?title=Sunrise_equation&oldid=728588924.

First Office Action issued in corresponding Russian Application No. 201610866720.5, dated Apr. 24, 2018, 9 pages.

* cited by examiner

METHODS AND DEVICES FOR ADJUSTING SCREEN BRIGHTNESS

CROSS-REFERENCE TO RELATED APPLICATION

This application claims priority to and benefits of Chinese Patent Application Serial No. 201610866720.5, filed with the State Intellectual Property Office of P. R. China on Sep. 29, 2016, the entire content of which is incorporated herein by reference.

FIELD

The present disclosure relates to the field of Internet technology, and more particularly, to a method and a device for adjusting screen brightness.

BACKGROUND

Currently, displays are widely used in various smart devices, such as smartphones, MP3s/MP4s, wearable smart watches, smart bands and panel computers etc. With the spread of various smart devices, people have developed more and more requirements in screen brightness of the display. In the related art, an optical sensor is used for monitoring ambient luminance so as to adjust the screen brightness intelligently. However, the adjusted screen brightness cannot meet the individual requirements of every user, so the user may have to adjust the screen brightness manually each time, thus the operation is complicated and the experience of using the smart device is directly affected.

SUMMARY

According to embodiments of the present disclosure, a method for adjusting screen brightness is provided. The method may include: determining a screen brightness adjusting curve corresponding to current time; and determining current screen brightness according to current ambient luminance and the screen brightness adjusting curve.

According to embodiments of the present disclosure, a device for adjusting screen brightness is provided. The device includes: a processor; and a memory for storing instructions executable by the processor. The processor is configured to: determine a screen brightness adjusting curve corresponding to current time; and determine current screen brightness according to current ambient luminance and the screen brightness adjusting curve.

According to embodiments of the present disclosure, a non-transitory computer-readable storage medium is provided. The non-transitory computer-readable storage medium has stored therein instructions that, when executed by a processor of a device, causes the device to perform a method for adjusting screen brightness, the method including: determining a screen brightness adjusting curve corresponding to current time; and determining current screen brightness according to current ambient luminance and the screen brightness adjusting curve.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
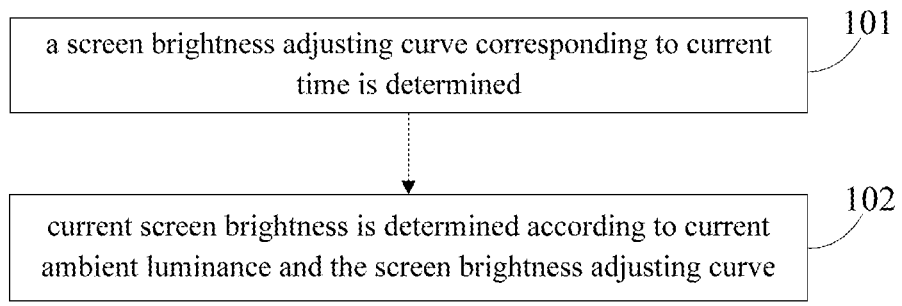
FIG. 1 is a flow chart showing a method for adjusting screen brightness according to an example embodiment.

FIG. 1 is a flow chart showing a method for adjusting screen brightness according to an example embodiment. The method for adjusting screen brightness may be used in a smart device with an LED display. As shown in FIG. 1, the method for adjusting screen brightness includes the followings.

In block 101, a screen brightness adjusting curve corresponding to current time is determined.

In one or more embodiments, the action of determining the screen brightness adjusting curve corresponding to the current time is performed when a change of ambient luminance is detected to match a predetermined change state. In one or more embodiments, the predetermined change state may be a process of ambient luminance changing, for example, from an outdoor radiant illumination environment to an indoor darker environment, or from an indoor bright light environment to an outdoor night environment, or from daylight to dark night etc.

In one or more embodiments, the screen brightness adjusting curve is configured to represent a reference function for adjusting screen brightness in a smart device, and parameters of the curve may be the ambient luminance.

In one or more embodiments, different time periods may correspond to different screen brightness adjusting curves. For example, daylight corresponds to one screen brightness adjusting curve, night corresponds to one screen brightness adjusting curve, or 5 to 7 o'clock in the morning corresponds to one screen brightness adjusting curve, 8 o'clock in the morning to 3 o'clock in the afternoon corresponds to one screen brightness adjusting curve, 4 to 7 o'clock in the afternoon corresponds to one screen brightness adjusting curve, 8 o'clock in the evening to 5 o'clock in the morning corresponds to one screen brightness adjusting curve. The device may create a new screen brightness adjusting curve when the current time and ambient luminance level are not within a preset range of existing screen brightness adjusting curves. Further, the device may adjust the screen brightness adjusting curve when the user manually adjust the screen brightness when adjusted brightness level is not consistent with the current screen brightness adjusting curve.

In this disclosure, the brightness obtained by the light sensor is not the only factor that the mobile terminal uses to determine the brightness of the screen. In other words, only using the brightness probably does not give the best user experience because human eyes may have different perceptions regarding the lowest brightness during the daytime and nighttime. Based on this, the disclosure proposes a method to measure the curve that is most suitable for the user's eye perception at different times, and adjust the brightness of the screen with different curves at different times to give the user a better experience.

In addition, the current light sensors can only measure the light intensity within a short measurement range from the sensors. When users watch the phone screen, the human eyes are usually more than 30 cm away from the phone screen, Ambient light outside of the sensor measurement range may affect the perception of the human eyes, which are not taken into account by the light intensity obtained from the light sensors.

In this disclosure, the system considers many factors affecting ambient light. One of the factors affecting ambient light is the local time, which is why we use multiple curves to adjust the brightness of the screen based on the different time of throughout the day. Further, different GPS locations, different day times, different seasons may also affect the ambient light. Therefore, the device may be set to use other optional parameters.

In one or more embodiments, lowest brightness values in screen brightness adjusting curves corresponding to different time may not be the same, for example, the lowest brightness value in daylight is usually higher than that in the night.

In one or more embodiments, the time corresponding to each time period may change according to the solar terms, and the time periods may be determined according to the sunrise and sunset time every day.

In block 102, current screen brightness is determined according to current ambient luminance and the screen brightness adjusting curve.

In one or more embodiments, the screen brightness adjusting curve corresponding to the current time is automatically determined. For example, when a significant change of ambient brightness is detected by a smart device, it may be determined whether it is day or night, or whether it is before drawn or toward evening according to the current time, and then the screen brightness adjusting curve is determined according to the time period corresponding to the current time. Thus, the screen brightness can be adjusted to be most suitable for human eyes according to time, the problem that the screen brightness cannot meet a user requirement caused by adjusting the screen into same brightness according to same ambient brightness in different time periods is avoided, and the problem that unsatisfactory user experience is caused by manually adjusting the screen brightness every time is also avoided.

In one or more embodiments, determining a screen brightness adjusting curve corresponding to current time may include:

determining a time period corresponding to the current time;
determining a screen brightness adjusting curve corresponding to the time period of the current time.

In one or more embodiments, determining a time period corresponding to the current time may include:
obtaining a current geographic position of the device;
determining a first preset time and a second preset time corresponding to the current geographic position, in which the first preset time is sunrise time and the second preset time is sunset time;
determining the time period corresponding to the current time according to an earlier or later relationship among the current time, the first preset time and the second preset time.

In one or more embodiments, determining first preset time and second preset time may include:
determining current geographic environment;
performing a weighting adjustment to the first preset time and the second preset time determined by the current geographic position according to the current geographic environment, and obtaining adjusted first preset time and adjusted second preset time.

In one or more embodiments, determining a time period corresponding to the current time may include:
determining the time period corresponding to the current time by determining whether a time duration that a display has been in a preset state exceeds a preset time period, in which the preset state is an off screen state.

In one or more embodiments, after determining the current screen brightness according to the current ambient luminance and the screen brightness adjusting curve, the method further includes:
obtaining meteorological data of a current geographic position;
based on the meteorological data of the current geographic position, performing a weighting adjustment to the current screen brightness determined according to the current ambient luminance and the screen brightness adjusting curve, and obtaining adjusted screen brightness.

In one or more embodiments, the method may further include:
determining whether an operation of setting a screen brightness adjusting mode is detected, when the operation of setting a screen brightness adjusting mode is detected, adjusting the screen brightness according to a screen brightness adjusting curve corresponding to the set screen brightness adjusting mode.

In one or more embodiments, the method may further include:
counting the screen brightness adjusted by a user during different time periods and in different ambient luminance; determining screen brightness adjusting curves in different time periods according to the counted the screen brightness adjusted by the user during different time periods and in different ambient luminance.

So far, with the above methods provided in embodiments of the present disclosure, the screen brightness can be adjusted to be most suitable for human eyes according to time, the problem that the screen brightness cannot meet a user requirement caused by adjusting the screen into same brightness according to same ambient brightness in different time periods is avoided, and the problem that unsatisfactory user experience is caused by manually adjusting the screen brightness every time is also avoided.

The specific means for adjusting screen brightness will be described in the following embodiments.

The technical solutions provided by the present disclosure will now be illustrated with reference to individual embodiments.

Figure 2A:
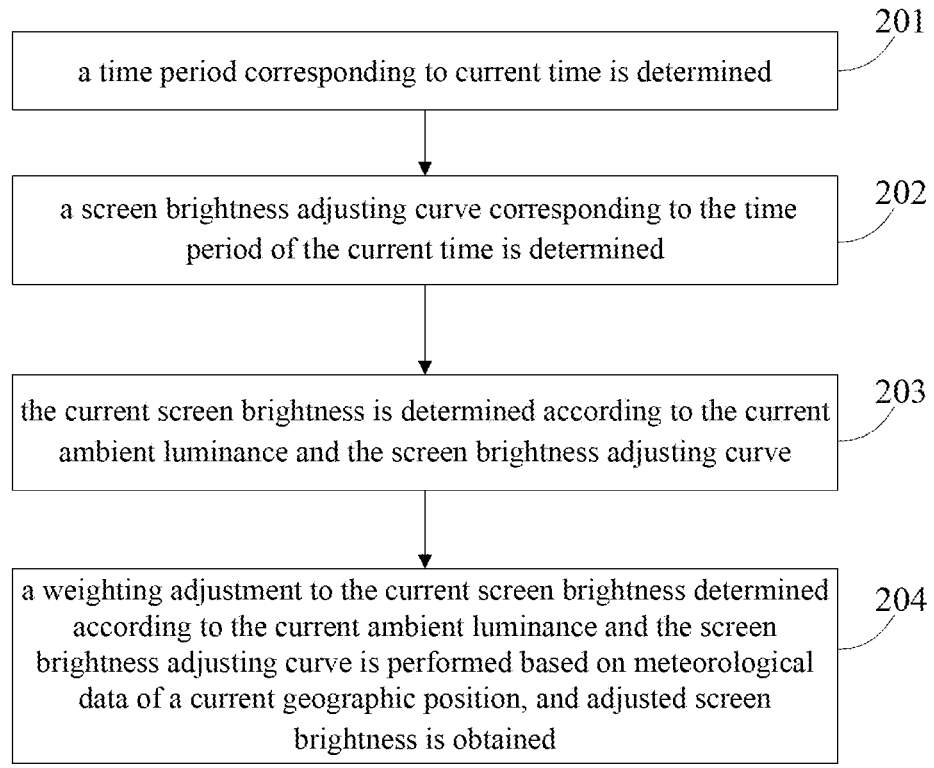
FIG. 2A is a flow chart showing a method for adjusting screen brightness according to example embodiment one.
Figure 2B:
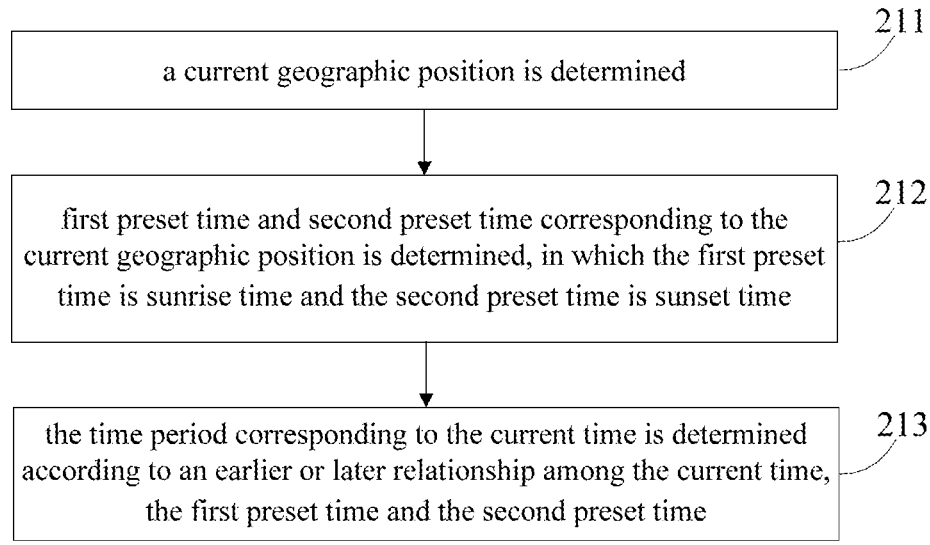
FIG. 2B is a flow chart showing block 201 according to example embodiment one.
Figure 2C:
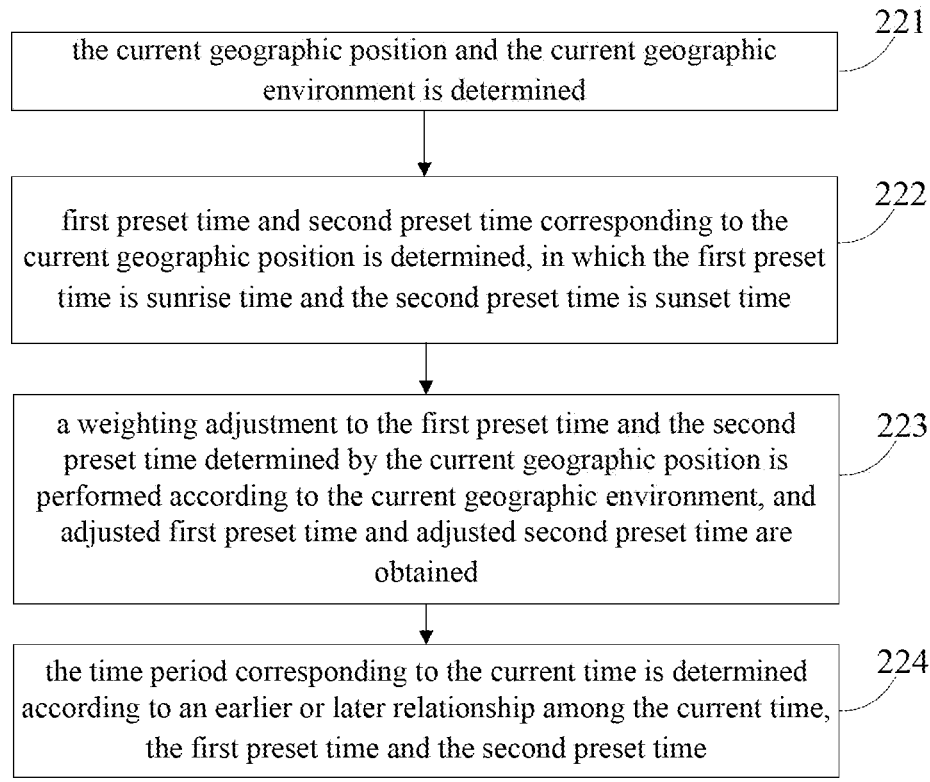
FIG. 2C is a flow chart showing another block 201 according to example embodiment one.

FIG. 2A is a flow chart showing a method for adjusting screen brightness according to example embodiment one, FIG. 2B is a flow chart showing a first block 201 according to example embodiment one, and FIG. 2C is a flow chart showing a second block 201 according to example embodiment one. The above methods provided by embodiments of the present disclosure is utilized in this embodiment, and an example about how to adjust screen brightness is illustrated in FIG. 2A, which includes the followings.

In block 201, a time period corresponding to current time is determined.

In one or more embodiments, the time period corresponding to the current time may be determined through three approaches.

In the first approach, the time period corresponding to the current time is determined according to the current geographic position.

In one or more embodiments, with reference to the embodiment shown in FIG. 2B, the flow path of determining the time period corresponding to the current time according to the current geographic position may include the followings.

In block 211, a current geographic position is determined.

In one or more embodiments, the current geographic position may be located by a GPS (Global Positioning System), for example, a current geographic position is Miyun district, Beijing. In another embodiment, the current geographic position may be located by an APP (Application) stored in the device.

In block 212, a first preset time and a second preset time corresponding to the current geographic position is determined. For example, the first preset time is sunrise time and the second preset time is sunset time.

In one or more embodiments, the current geographic position and the sunrise and sunset time may be determined by accessing an Internet server, for example, by accessing an Internet server, the sunrise and sunset time in Dezhou city, Shandong province on Sep. 6, 2016 may be obtained, which are 05:49:21 and 18:36:18.

In block 213, the time period corresponding to the current time is determined according to an earlier or later relationship among the current time, the first preset time and the second preset time. Assuming that the first preset time is earlier than the second preset time the earlier or later relationship may include following three relationships: 1) the current time is earlier than both first preset time and second preset time; 2) the current time is later than the first preset time and earlier than the second preset time; and 3) the current time is later than both first preset time and second preset time.

In one or more embodiments, when the time periods are divided into two periods of day and night, then a current time period may be determined directly according to sunrise time and sunset time, for example, if the current time is 6 o'clock in the afternoon, position is Dezhou city, Shandong province, then it can be determined that the current time is in a day time period. In another embodiment, when the 24 hours of a day is divided into four time periods of night, around sunset, daytime, and around sunrise, then it may also be divided according to sunrise time and sunset time, for example, around sunrise is from 5 to 7 o'clock in the morning, daytime is from 8 o'clock in the morning to 5 o'clock in the afternoon, around sunset is from 6 to 8 o'clock in the afternoon, and night is from 8 o'clock in the evening to 5 o'clock in the morning.

In one or more embodiments, the 24 hours of a day may also be divided into other numbers of time periods according to the first preset time and the second preset time, and there is no limit for the numbers of time periods in the present disclosure.

In the second approach, the time period corresponding to the current time is determined according to a current geographic position and the current geographic environment.

In one or more embodiments, with reference to the embodiment shown in FIG. 2C, the flow path of determining the time period corresponding to the current time according to the current geographic position and the current geographic environment may include the followings.

In block 221, the current geographic position and the current geographic environment is determined.

In one or more embodiments, the current geographic environment may be a current topography environment, for example, the current geographic environment is mountain area or flat lands.

In block 222, first preset time and second preset time corresponding to the current geographic position is determined, in which the first preset time is sunrise time and the second preset time is sunset time.

In one or more embodiments, since the description of block 222 may be found with reference to the description of block 212 in an embodiment shown in FIG. 2B, thus it will not be elaborated here.

In block 223, a weighting adjustment to the first preset time and the second preset time determined by the current geographic position is performed according to the current geographic environment, and adjusted first preset time and adjusted second preset time are obtained.

In one or more embodiments, the weight coefficient corresponding to each geographic environment may be obtained by a smart device provider from massive statistic data. For example, a weight coefficient of sunset in mountain area is 1, i.e. the ambient luminance may suddenly decrease during sunset, while a weight coefficient of sunset in flat lands is 1.01, i.e. the ambient luminance may suddenly decrease in about half an hour from sunset.

In block 224, the time period corresponding to the current time is determined according to an earlier or later relationship among the current time, the first preset time and the second preset time.

In one or more embodiments, since the description of block 224 may be found with reference to the description of block 213 in an embodiment shown in FIG. 2B, thus it will not be elaborated here.

In the third approach, the time period corresponding to the current time is determined by the off-screen time of a display.

In one or more embodiments, determining the time period corresponding to the current time by determining whether a time duration that the display has been in an off-screen state exceeds a preset time period. For example, when the display has been in an off-screen state for more than 6 hours and the current time is 6 o'clock in the morning, then it may be determined that the current time is in a daytime period; when the display has been in an off-screen state for more than 6 hours and the current time is 4 o'clock in the afternoon, then the current time is also in a daytime period.

In one or more embodiments, usually, only it may be determined whether it is after sunrise by the duration of the off-screen time, however, it is not determined whether it is around nightfall, thus the time period is determined through the first two approaches more accurately, while through the third approach more easily.

In block 202, a screen brightness adjusting curve corresponding to the time period of the current time is determined.

In one or more embodiments, the screen brightness adjusting curve corresponding to each time period may be obtained by a smart device provider from counting massive statistic data and may be stored in the smart device. The massive statistic data may be obtained from multiple devices in the same region that is within a preset distance to a preset location. In some other embodiments, the screen brightness adjusting curve corresponding to each time period may be adjusted by a user according to the embodiment shown in FIG. 4 in a setting process before the smart device is used.

In block 203, the current screen brightness is determined according to the current ambient luminance and the screen brightness adjusting curve.

In block 204, a weighting adjustment to the current screen brightness determined according to the current ambient luminance and the screen brightness adjusting curve is performed based on meteorological data of a current geographic position, and adjusted screen brightness is obtained.

In one or more embodiments, the meteorological data may be current weather condition, such as overcast, cloudy and sunny etc. For example, when it is overcast, black clouds are gathering in the sky, in order to make the screen brightness suitable for human eyes, the screen brightness may be turned to little darker.

In one or more embodiments, the weighting coefficient for adjusting screen brightness according to the meteorological data may be obtained by a smart device provider from counting massive statistic data and may be stored in the smart device.

In some embodiments, the time period corresponding to the current time is determined according to the geographic position of the smart device. The time periods may also be divided according to the geographic positions. Accordingly, the division of time periods can be more conform to the actual condition of the user, and the screen brightness may be adjusted to a brightness most suitable for human eyes. In addition, by determining the current geographic environment of the smart device, a better distinguish between sunrise time and sunset time can be made. For example, for same latitude, the ambient luminance in mountain area may decrease as soon as sunset while the ambient luminance in flat lands may decrease in a short delay after sunset. Thus, by considering the current geographic environment of the smart device, the division of time periods can be more conform to the actual condition of the user.

Figure 3:
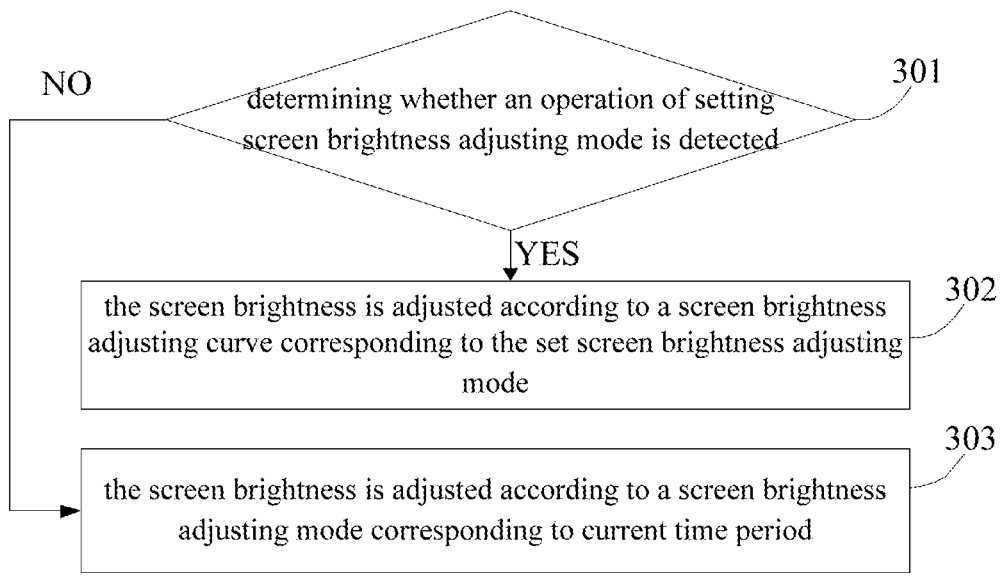
FIG. 3 is a flow chart showing a method for adjusting screen brightness according to example embodiment two.

FIG. 3 is a flow chart showing a method for adjusting screen brightness according to example embodiment two. The above methods provided by embodiments of the present disclosure is utilized in this embodiment, and an example about how to adjust screen brightness according to what set by a user is illustrated in FIG. 3, which includes the followings.

In block 301, determining whether an operation of setting a screen brightness adjusting mode is detected. If the operation of setting a screen brightness adjusting mode is detected, then block 302 is executed; if the operation of setting a screen brightness adjusting mode is not detected, then block 303 is executed.

In one or more embodiments, the operation of setting a screen brightness adjusting mode may be triggered by a touch screen or a physical push-button. In another embodiment, the operation of setting a screen brightness adjusting mode may be triggered by a physical push-button.

In one or more embodiments, screen brightness adjusting modes may be automatically provided to the user for choice when the ambient luminance changes. In another embodiment, a screen brightness adjusting mode may be triggered when the user is unsatisfied with the current brightness, for example, when the user is outdoor and feels that the screen is not bright enough, and then the screen brightness adjusting mode may be set to an outdoor mode.

In block 302, the screen brightness is adjusted according to a screen brightness adjusting curve corresponding to the set screen brightness adjusting mode.

In block 303, the screen brightness is adjusted according to a screen brightness adjusting mode corresponding to current time period.

In this embodiment, by providing multiple screen brightness adjusting modes to the user for choice, screen brightness adjusting requirements in different scenarios can be satisfied, and the user experience is optimized.

Figure 4:
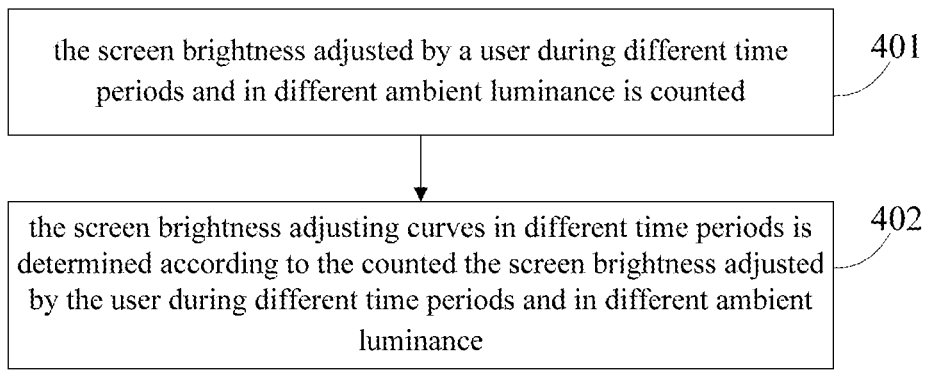
FIG. 4 is a flow chart showing a method for determining a screen brightness adjusting curve according to example embodiment three.

FIG. 4 is a flow chart showing a method for determining a screen brightness adjusting curve according to example embodiment three. The above methods provided by embodiments of the present disclosure is utilized in this embodiment, and an example about how to adjust screen brightness according to statistic data of the screen brightness adjusted by a user is illustrated in FIG. 4, which includes the followings.

In block 401, the screen brightness adjusted by a user during different time periods and in different ambient luminance is counted.

In one or more embodiments, the adjusted screen brightness by the user during different time periods such as day and night are counted for a preset time period (for example, one month) ever since the smart device was used.

In block 402, the screen brightness adjusting curves in different time periods is determined according to the counted the screen brightness adjusted by the user during different time periods and in different ambient luminance.

In one or more embodiments, screen brightness adjusting curves in different time periods are generated according to the counted the screen brightness adjusted by the user during different time periods and in different ambient luminance, and are updated to the smart device.

In one or more embodiments, a screen brightness adjusting curve most suitable for the user may be determined by counting the screen brightness adjusted by the user during different time periods and in different ambient luminance, so that the screen brightness can be adjusted to be most suitable for the user according to the screen brightness adjusting curve in the future.

Figure 5:
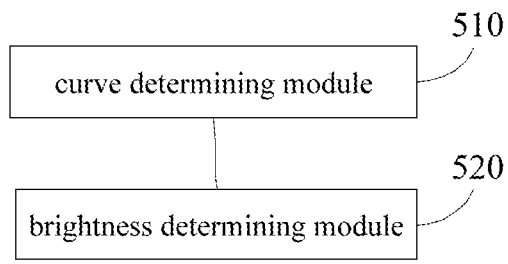
FIG. 5 is a block diagram showing an apparatus for adjusting screen brightness according to an example embodiment.

FIG. 5 is a block diagram showing an apparatus for adjusting screen brightness according to an example embodiment. As shown in FIG. 5, the apparatus for adjusting screen brightness includes a curve determining module 510 and a brightness determining module 520.

The curve determining module 510 is configured to determine a screen brightness adjusting curve corresponding to current time.

The brightness determining module 520 is configured to determine current screen brightness according to current ambient luminance and the screen brightness adjusting curve determined by the curve determining module 510.

Figure 6:
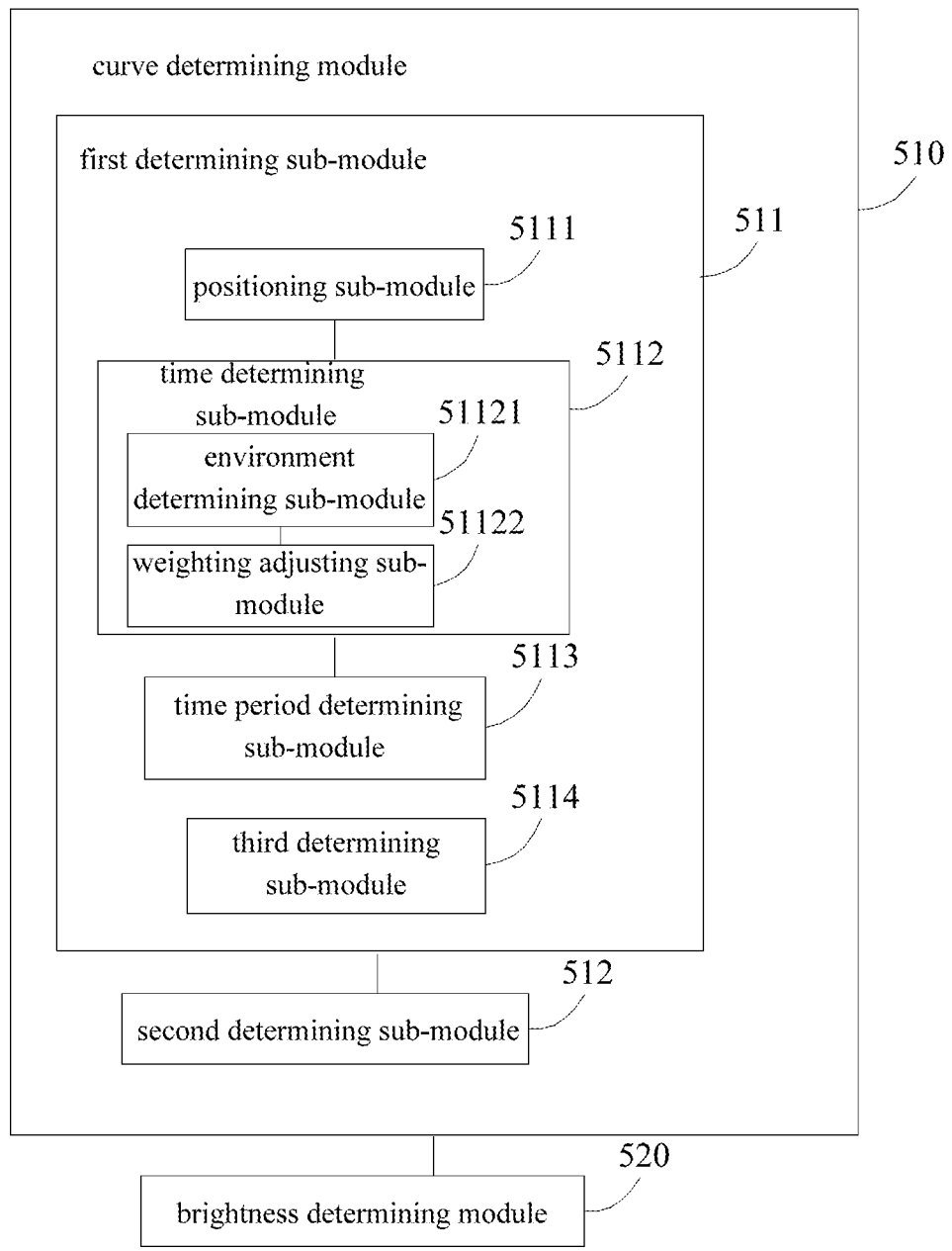
FIG. 6 is a block diagram showing another apparatus for adjusting screen brightness according to an example embodiment.

FIG. 6 is a block diagram showing another apparatus for adjusting screen brightness according to an example embodiment. As shown in FIG. 6, on the basis of the embodiment shown in FIG. 5, in one or more embodiments, the curve determining module 510 may include a first determining sub-module 511 and a second determining sub-module 512.

The first determining sub-module 511 is configured to determine a time period corresponding to the current time.

The second determining sub-module 512 is configured to determine a screen brightness adjusting curve corresponding to the time period of the current time determined by the first determining sub-module 511.

In one or more embodiments, the first determining sub-module 511 includes a positioning sub-module 5111, a time determining sub-module 5112 and a time period determining sub-module 5113.

The positioning sub-module 5111 is configured to obtain a current geographic position.

The time determining sub-module 5112 is configured to determine first preset time and second preset time corresponding to the current geographic position located by the positioning sub-module 5111, in which the first preset time is sunrise time and the second preset time is sunset time.

The time period determining sub-module 5113 is configured to determine the time period corresponding to the current time according to an earlier or later relationship among the current time, the first preset time and the second preset time.

In one or more embodiments, the time determining sub-module 5112 includes an environment determining sub-module 51121 and a weighting adjusting sub-module 51122.

The environment determining sub-module 51121 is configured to determine current geographic environment.

The weighting adjusting sub-module 51122 is configured to perform a weighting adjustment to the first preset time and the second preset time determined by the current geographic position according to the current geographic environment determined by the environment determining sub-module 51121 and to obtain adjusted first preset time and adjusted second preset time.

In one or more embodiments, the first determining sub-module 511 includes a third determining sub-module 5114.

The third determining sub-module 5114 is configured to determine a time period corresponding to the current time by determining whether a time duration that a display has been in a preset state exceeds a preset time period, in which the preset state is an off screen state.

Figure 7:
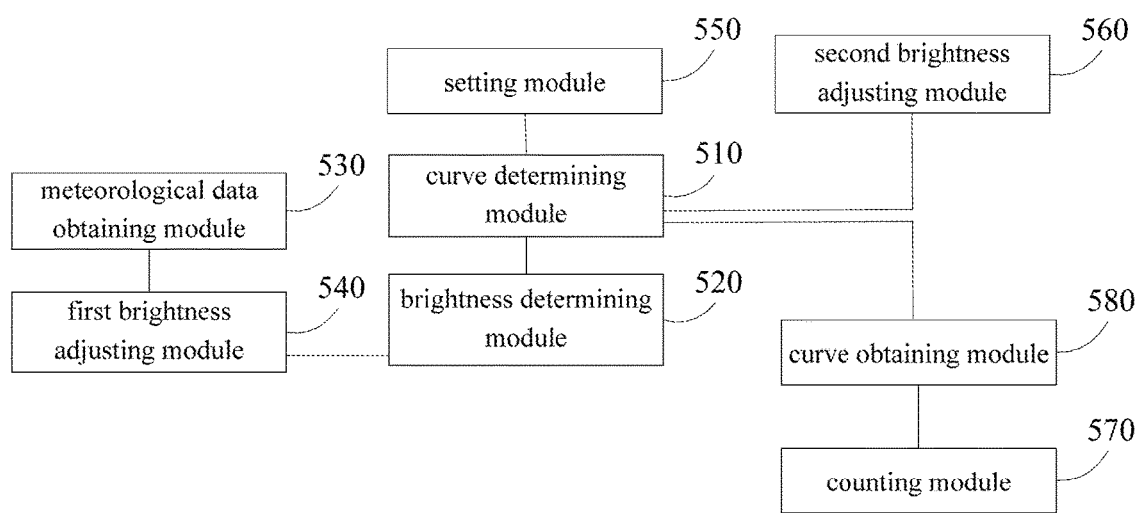
FIG. 7 is a block diagram showing yet another apparatus for adjusting screen brightness according to an example embodiment.

FIG. 7 is a block diagram showing yet another apparatus for adjusting screen brightness according to an example embodiment. As shown in FIG. 7, on the basis of the embodiment shown in FIG. 5 or FIG. 6, in one or more embodiments, the apparatus may also include a meteorological data obtaining module 530 and a first brightness adjusting module 540.

The meteorological data obtaining module 530 is configured to obtain meteorological data of a current geographic position.

The first brightness adjusting module 540 is configured to, based on the meteorological data of the current geographic position obtained by the meteorological data obtaining module 530, perform a weighting adjustment to a current screen brightness determined according to the current ambient luminance and the screen brightness adjusting curve, and to obtain adjusted screen brightness.

In one or more embodiments, the apparatus may also include a setting module 550 and a second brightness adjusting module 560.

The setting module 550 is configured to determine whether an operation of setting a screen brightness adjusting mode is detected.

The second brightness adjusting module 560 is configured to adjust the screen brightness according to a screen brightness adjusting curve corresponding to the set screen brightness adjusting mode when the operation of setting a screen brightness adjusting mode is detected by the setting module 550.

In one or more embodiments, the apparatus may also include a counting module 570 and a curve obtaining module 580.

The counting module 570 is configured to count the screen brightness adjusted by a user during different time periods and in different ambient luminance. The apparatus may count the number of times the user manually adjusting the screen brightness.

The curve obtaining module 580 is configured to determine screen brightness adjusting curves in different time periods according to the counted screen brightness adjusted by the user during different time periods and in different ambient luminance. Here, the curve may be stored as a representation of the function (screen brightness function) in two-dimensional coordinates, which represents the correspondence between the luminance value obtained by the sensor and the screen brightness. Once the current time period is determined, the device may determine which curve to use to adjust the screen brightness. Then the device may determine screen brightness value using the curve according to the current brightness value obtained by the sensor.

With respect to the devices in the above embodiments, the specific manners for performing operations for individual modules therein have been described in detail in the embodiment regarding to the methods, which will not be elaborated herein.

Since the device embodiments substantially correspond to the method embodiments, reference is made to the description of the method embodiments as to details not disclosed in the device embodiments. The above-described device embodiments are merely for the purpose of illustration. Those units described as separate components may be or may not be physically separated; those units described as a display component may be or may not be a physical unit, i.e., either located at one place or distributed onto a plurality of network units. The object of the present disclosure may be achieved by part or all of modules in accordance with practical requirements. It would be appreciated and executable by those skilled in the art without creative labor.

Figure 8:
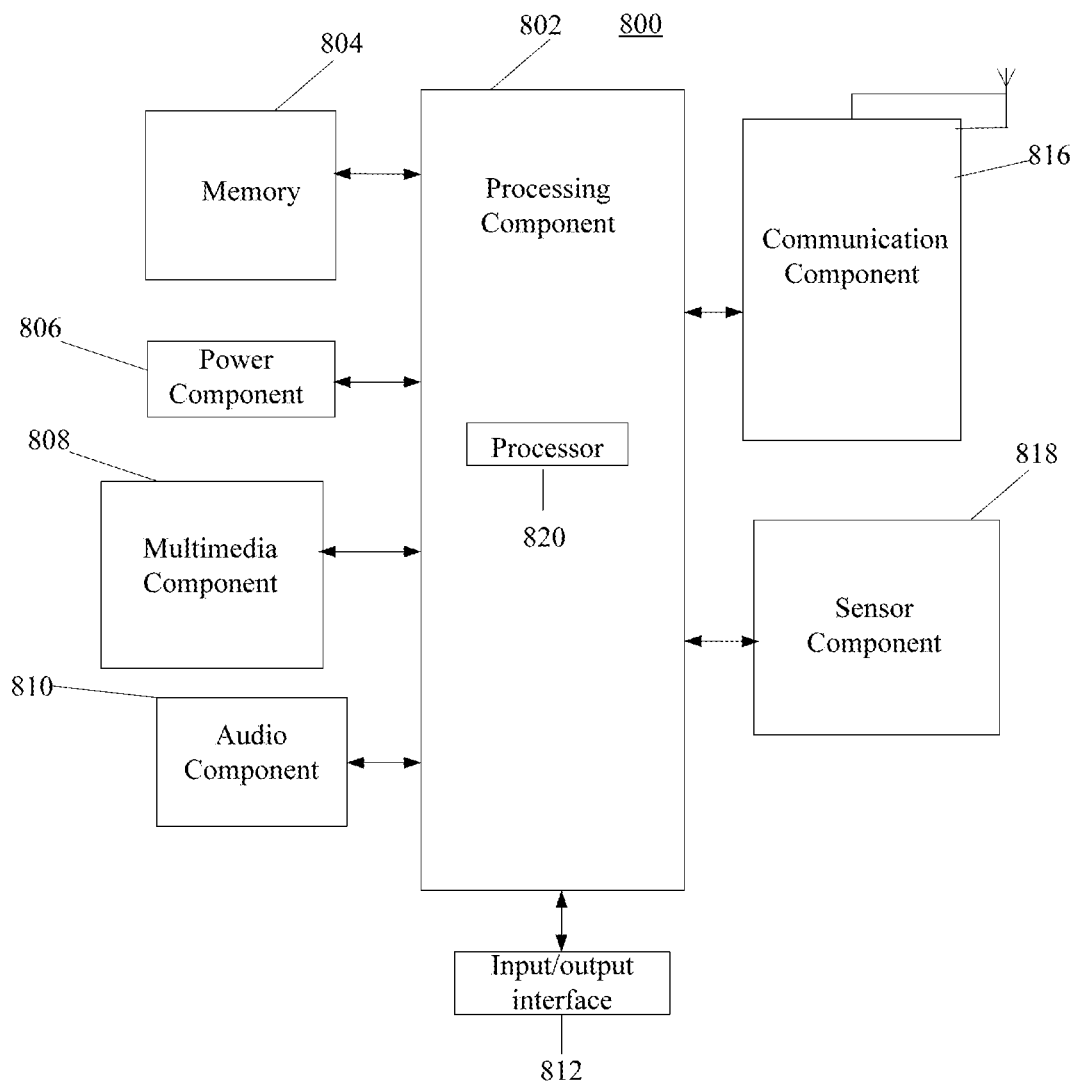
FIG. 8 is a block diagram of a device for adjusting screen brightness according to an example embodiment.

FIG. 8 is a block diagram of a device for adjusting screen brightness according to an example embodiment. For example, the device 800 may be smart equipment such as a smartphone or a panel computer.

With reference to FIG. 8, device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above-described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, messages, pictures, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. The light sensor may also be configured to detect ambient luminance. In some embodiments, the sensor component 814 may also include an accelerometer sensor, a gyroscope sensor, a magnetic sensor, a distance sensor, a pressure sensor, or a temperature sensor.

The communication component 816 is configured to facilitate communication, wired or wirelessly, between the device 800 and other devices. The device 800 can access a wireless network based on a communication standard, such as WIFI, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods for adjusting screen brightness. The method includes determining a screen brightness adjusting curve corresponding to current time and determining current screen brightness according to current ambient luminance and the screen brightness adjusting curve.

In exemplary embodiments, there is also provided a non-transitory computer readable storage medium including instructions, such as the memory 804 including instructions, the above instructions are executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

What is claimed is:

1. A method for adjusting screen brightness, comprising:
    determining, by a device comprising a processor and a screen, a screen brightness adjusting curve corresponding to a current time; and
    determining, by the device, current screen brightness of the screen according to a current ambient luminance and the screen brightness adjusting curve;
    wherein determining the screen brightness adjusting curve comprises: determining a time period corresponding to the current time; and determining the screen brightness adjusting curve corresponding to the time period of the current time; and
    wherein determining the time period corresponding to the current time comprises: determining the time period corresponding to the current time by determining whether a time duration that a display has been in a preset state exceeds a preset time period, wherein the preset state is an off screen state.

2. The method according to claim 1, wherein determining a time period corresponding to the current time comprises:
    obtaining a current geographic position of the device;
    determining a first preset time and a second preset time corresponding to the current geographic position, wherein the first preset time is sunrise time and the second preset time is sunset time; and
    determining the time period corresponding to the current time according to an earlier or later relationship among the current time, the first preset time and the second preset time.

3. The method according to claim 2, wherein determining the first preset time and the second preset time comprises:
    determining current geographic environment; and
    performing a weighting adjustment to the first preset time and the second preset time determined by the current geographic position according to the current geographic environment, and obtaining adjusted first preset time and adjusted second preset time.

4. The method according to claim 1, wherein after determining current screen brightness according to the current ambient luminance and the screen brightness adjusting curve, further comprises:
    obtaining meteorological data of a current geographic position; and
    based on the meteorological data of the current geographic position, performing a weighting adjustment to the current screen brightness determined according to the current ambient luminance and the screen brightness adjusting curve, and obtaining adjusted screen brightness.

5. The method according to claim 1, further comprising:
    determining whether an operation of setting a screen brightness adjusting mode is detected; and
    when the operation of setting a screen brightness adjusting mode is detected, adjusting the screen brightness according to a screen brightness adjusting curve corresponding to the set screen brightness adjusting mode.

6. The method according to claim 1, further comprising:
    counting the number of times the screen brightness is adjusted by a user during different time periods and in different ambient luminance; and
    determining screen brightness adjusting curves in different time periods according to the said count.

7. A device for adjusting screen brightness, comprising:
    a processor;
    a memory for storing instructions executable by the processor;
    wherein the processor is configured to: determine a screen brightness adjusting curve corresponding to current time, and
    determine a current screen brightness according to a current ambient luminance and the screen brightness adjusting curve and
    wherein the processor is configured to determine a screen brightness adjusting curve corresponding to current time by acts of: determining a time period corresponding to the current time; and determining a screen brightness adjusting curve corresponding to the time period of the current time, and
    wherein the processor is configured to determine a time period corresponding to the current time by an act of: determining the time period corresponding to the current time by determining whether a time duration that a display has been in a preset state exceeds a preset time period, wherein the preset state is an off screen state.

8. The device according to claim 7, wherein the processor is configured to determine a time period corresponding to the current time by acts of:
    obtaining a current geographic position of the device;
    determining first preset time and second preset time corresponding to the current geographic position, wherein the first preset time is sunrise time and the second preset time is sunset time; and
    determining the time period corresponding to the current time according to an earlier or later relationship among the current time, the first preset time and the second preset time.

9. The device according to claim 8, wherein the processor is configured to determine first preset time and second preset time by acts of:
    determining current geographic environment; and
    performing a weighting adjustment to the first preset time and the second preset time determined by the current geographic position according to the current geographic environment, and obtaining adjusted first preset time and adjusted second preset time.

10. The device according to claim 7, wherein after determining current screen brightness according to current ambient luminance and the screen brightness adjusting curve, the processor is further configured to:
    obtain meteorological data of a current geographic position; and
    based on the meteorological data of the current geographic position, perform a weighting adjustment to the current screen brightness determined according to the current ambient luminance and the screen brightness adjusting curve, and obtaining adjusted screen brightness.

11. The device according to claim 7, wherein the processor is further configured to:
    determine whether an operation of setting a screen brightness adjusting mode is detected; and
    when the operation of setting a screen brightness adjusting mode is detected, adjust the screen brightness according to a screen brightness adjusting curve corresponding to the set screen brightness adjusting mode.

12. The device according to claim 7, wherein the processor is further configured to:
    count the number of times the screen brightness is adjusted by a user during different time periods and in different ambient luminance; and
    determine screen brightness adjusting curves in different time periods according to the said count.

13. A non-transitory computer-readable storage medium having stored therein instructions that, when executed by a processor of a device, causes the device to perform a method for adjusting screen brightness, the method comprising:
   determining a screen brightness adjusting curve corresponding to current time; and
   determining current screen brightness according to current ambient luminance and the screen brightness adjusting curve; and
   wherein determining the screen brightness adjusting curve comprises: determining a time period corresponding to the current time; and determining the screen brightness adjusting curve corresponding to the time period of the current time; and
   wherein determining the time period corresponding to the current time comprises: determining the time period corresponding to the current time by determining whether a time duration that a display has been in a preset state exceeds a preset time period, wherein the preset state is an off screen state.

14. The non-transitory computer-readable storage medium according to claim 13, wherein determining the time period corresponding to the current time comprises:
   obtaining a current geographic position;
   determining first preset time and second preset time corresponding to the current geographic position, wherein the first preset time is sunrise time and the second preset time is sunset time; and
   determining the time period corresponding to the current time according to an earlier or later relationship among the current time, the first preset time and the second preset time.

15. The non-transitory computer-readable storage medium according to claim 14, wherein determining the first preset time and the second preset time comprises:
   determining current geographic environment; and
   performing a weighting adjustment to the first preset time and the second preset time determined by the current geographic position according to the current geographic environment, and obtaining adjusted first preset time and adjusted second preset time.

* * * * *